(12) United States Patent
Abraham et al.

(10) Patent No.: US 8,443,231 B2
(45) Date of Patent: May 14, 2013

(54) UPDATING A LIST OF QUORUM DISKS

(75) Inventors: Sara Abraham, Los Altos, CA (US);
Craig Harmer, San Francisco, CA (US);
Prasanta Dash, San Jose, CA (US);
Vishal Kher, Auburndale, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 12/758,201

(22) Filed: Apr. 12, 2010

(65) Prior Publication Data

US 2011/0252270 A1    Oct. 13, 2011

(51) Int. Cl.
*G06F 11/00* (2006.01)

(52) U.S. Cl.
USPC .............. 714/12; 714/4.1; 714/6.3; 709/220

(58) Field of Classification Search ............... None
See application file for complete search history.

(56) References Cited

U.S. PATENT DOCUMENTS 6,490,693 B1 * 12/2002 Briskey et al. ............ 714/15
6,807,558 B1    10/2004 Hassett et al.
2003/0188160 A1  10/2003 Sunder et al.
2004/0249965 A1  12/2004 Huggins et al.
2005/0268154 A1 * 12/2005 Wipfel et al. ............ 714/4
2008/0077635 A1   3/2008 Sporny et al.
2011/0066666 A1   3/2011 Takaoka et al.
2011/0179231 A1 *  7/2011 Roush ................... 711/152

OTHER PUBLICATIONS

HP StorageWorks 4x00/6x00/8x00 Enterprise Virtual Array configuration best practices white paper, Rev. 1, Aug. 2007, p. 11.*
Brien M. Posey, Understanding How Cluster Quorums Work, windowsnetworking.com, Jan. 13, 2005, p. 2.*
Naor et al., "Scalable and Dynamic Quorum Systems," Distributed Computing, vol. 17, No. 4/May 2005, pp. 311-322.
Herlihy Maurice, "Dynamic Quorum Adjustment for Partitioned Data," ACM Transactions on Database Systems, vol. 12, No. 2, Jun. 1987, pp. 170-194.

* cited by examiner

*Primary Examiner* — Scott Baderman
*Assistant Examiner* — Jason Bryan
(74) *Attorney, Agent, or Firm* — Wilmer Cutler Pickering Hale and Dorr LLP (57) ABSTRACT

A node in a server cluster is designated as a quorum disk. The node stores a list of other nodes in the server cluster also designated as quorum disks. The node can replace the first list with a second and more recent list of quorum disks only if the second list is updated on at least a simple majority of quorum disks on the first list.

19 Claims, 7 Drawing Sheets

| Time | Node A List | Node B List | Node C List | Node D List | Node E List | Node F List | Node G List |
|------|-------------|-------------|-------------|-------------|-------------|-------------|-------------|
| T0   | ABC(0)      | ABC(0)      | ABC(0)      | —           | —           | —           | —           |
| T1   | ABD(1)      | ABD(1)      | ABC(0)      | ABD(1)      | —           | —           | —           |
| T2   | ABD(1)      | BDE(2)      | ABC(0)      | BDE(2)      | BDE(2)      | —           | —           |
| T3   | ABD(1)      | BDE(2)      | ABC(0)      | DEF(3)      | DEF(3)      | DEF(3)      | —           |
| Th   | ABD(1)      | BDE(2)      | ABC(0)      | DEF(3)      | EFG(4)      | EFG(4)      | EFG(4)      |

(N) = List Version

UPDATING A LIST OF QUORUM DISKS

RELATED U.S. APPLICATION

This application is related to U.S. patent application Ser. No. 12/650,147 by P. Dash et al., filed Dec. 30, 2009, entitled "Locating the Latest Version of Replicated Data Files," assigned to the assignee of the present invention, and hereby incorporated by reference in its entirety.

BACKGROUND

In a distributed file storage system, servers may be organized as one or more clusters of cooperating nodes. In one type of cluster organization, called "shared data clustering," the nodes of a cluster (each of which may correspond to a separate physical server) share access to data storage devices. For example, the shared data storage devices may be accessible to each node of a cluster over a storage area network (SAN) implemented using a combination of Fibre Channel over Ethernet (FCoE) and other storage interconnects such as various forms of SCSI (Small Computer System Interface) including (SCSI (Internet SCSI) and other Internet Protocol-based (IP-based) storage protocols. Shared data clustering may allow each node to access large amounts of data, and may allow data to be accessed even in the event of one or more node failures—for example, surviving nodes may take up the functions originally performed by failed nodes, and may allow access to data previously being accessed from the failed nodes.

In the event of a failure of communication between the nodes of a cluster, a cluster may become partitioned—that is, instead of all the nodes in the cluster being able to communicate with each other, each node in the cluster may only be able to communicate with a particular subset (or none) of the other nodes. Sub-clusters are another scenario, where node A can communicate with node B, and node B with node C, but node A cannot communicate with node C. In the latter case, a protocol trims the cluster to a fully connected subset, such a protocol being well known.

Thus, nodes may form isolated sub-clusters, where a given node can communicate only with other nodes in its own sub-cluster, but not with a node in any other sub-cluster. Under some circumstances, more than one sub-cluster or node may assume that it is the only surviving and valid sub-cluster or node, and may attempt to access shared data as though no other node or sub-cluster remains operational. Such a scenario, in which multiple nodes or sets of nodes form independent sub-clusters, is termed a "split-brain" scenario.

In a split-brain scenario, more than one sub-cluster or node may attempt to access and update shared storage in an uncoordinated manner, thereby potentially causing data corruption. Data corruption can be avoided by shutting down all but one of the sub-clusters and guaranteeing that the remaining nodes form a healthy, communicating cluster.

Conventional split-brain solutions use dedicated coordination points (known as quorum disks) as a method of communication when network connectivity is lost. These solutions rely on one or more of the quorum disks being up and available. Because all nodes can communicate with the quorum disks even during a split-brain scenario, the various sub-clusters can coordinate with each other and reach an agreement as to which sub-cluster is to survive and which sub-clusters are to be shut down. The quorum disks may also be unavailable, or partially unavailable, or even differently available to different sub-clusters.

The need to dedicate extra and fixed resources as quorum disks can increase costs. In addition, the dedicated quorum disks are typically configured and managed by an administrator, who also has the responsibility of detecting and replacing each failed quorum disk. The quorum disks need to be continually monitored to make sure they are functioning properly and can be reached by all the nodes in the server cluster; however, the quorum disks are otherwise idle and under-utilized. Thus, conventional implementations increase the amount of administrative overhead, further increasing costs.

SUMMARY

In one embodiment, selected nodes in a server cluster are designated as quorum disks. A list of the subset of nodes designated as quorum disks is stored on each node in the subset. Version information associated with the list can also be stored. The nodes on the list are accessed in response to a split-brain event. In one such embodiment, the quorum disks are chosen from different failure domains that are defined for the server cluster. In another such embodiment, the number of quorum disks depends on the number of nodes in the server cluster.

In one embodiment, the list is replaced with a second and more recent list of quorum disks only if the second list is written to at least a "simple majority" (one more than one-half) of quorum disks on the first list. Lists can be updated to designate another node in the server cluster as a quorum disk in place of a node that is found to be unavailable. The nodes in the server cluster can be monitored to identify candidates for the quorum disks.

In another embodiment, in response to a split-brain event, for example, a search is conducted to identify nodes designated as quorum disks. In a first phase of the search, a first subset of nodes in the server cluster is identified. After the first phase, the search is propagated through succeeding subsets of the nodes, where each succeeding subset is selected based upon lists of nodes stored on nodes identified in a preceding phase of the search, until the latest list of nodes designated as quorum disks is found.

In yet another embodiment, a node in a server cluster is designated as a quorum disk. The node stores a list of other nodes in the server cluster also designated as quorum disks. The first list in the designated node can be replaced with a second and more recent list of quorum disks only if the second list is received by at least a simple majority of quorum disks on the first list.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical, mechanical, photonic, or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "identifying," "propagating," "searching," "monitoring," "selecting," "updating," "determining," "choosing," "replacing," "storing," "associating," "designating," or the like, refer to actions and processes (e.g., the flowcharts of FIGS. 4A, 4B, 4C, 4D, 8, and 9, respectively) of a computer system or similar electronic computing device or processor (e.g., system 210 of FIG. 2). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory, MEMS (Micro Electrical Mechanical System), phase-charge memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above can also be included within the scope of computer-readable storage media.

In overview, embodiments of the present disclosure advantageously use network nodes (e.g., data servers, LUNs, object storage devices, data disks, etc.) as quorum disks. In other words, nodes that are part of a server cluster and that function as object storage devices also take on the functionality of quorum disks. Thus, additional, special or dedicated hardware and configurations are not required for quorum disks, reducing costs. Administrative overhead is also reduced, further reducing costs.

Data disks, data servers, LUNs, object storage devices, etc., can be used as quorum disks by writing a small amount of appropriate, critical data in a well-known location. The location and number of quorum disks can be dynamically updated based upon the configuration and policy in effect, the desired redundancy level (e.g., the number of concurrent failures that can be tolerated), and the desired availability level (e.g., the mean time between failures).

For simplicity of discussion, the dual-function data/quorum disks will be referred to simply as quorum disks; as just noted, such quorum disks are distinguished from conventional quorum disks by their added functionality and by the fact that they are functioning nodes within the server cluster, not dedicated quorum disks appended to the server cluster. A set of protocols and algorithms ensures that, if a simple majority of the quorum disks is available to at least one sub-cluster during a split-brain scenario, then one of the sub-clusters will survive. Also, the quorum disks are chosen across failure domains.

Thus, given a simple majority of accessible quorum disks, where different sub-clusters may access different subsets of the quorum disks, then embodiments of the present disclosure assure that at most one sub-cluster survives.

In one embodiment, during cluster initialization, a set of quorum disks is selected from the list of network nodes. In one embodiment, the number of quorum disks is dynamic and is a function of the total number of nodes (and perhaps other factors mentioned above, such as the desired redundancy level and the desired availability level (e.g., the mean time between failures)); as the size of the server cluster changes, the number of quorum disks changes. Each quorum disk can be initialized with information such as the following:
  i) cluster membership: a list of nodes in the server cluster;
  ii) an activity count, updated periodically and used to detect non-active members and pre-existing split brain scenarios; and
  iii) a list of the current nodes designated as quorum disks; the list includes the quorum disk on which the list is stored as well as the other quorum disks.

During operation, the health of the network nodes, and thus the health of the quorum disks, is routinely checked. If a quorum disk fails, a new quorum disk is selected from the list of available nodes, and the list of quorum disks is also updated. New quorum disks can be added or existing quorum disks removed for other reasons as well, such as those mentioned above. For example, as noted above, if the size of the server cluster changes, the number of quorum disks may also change. Quorum disks may be changed, too, if a new network node is a better candidate as a quorum disk because, for example, it provides better balance across failure domains.

As mentioned above, the list of quorum disks is stored on each quorum disk in the list and subsequently updated as needed. An update is successful if at least a quorum (e.g., at least a simple majority) of the quorum disks on the earlier version of the list is successfully updated—version 1 of the list can be created if version 1 of the list is received by a simple majority of the quorum disks on version 0 of the list. As will be seen, this means that when a node that has access to a simple majority of the quorum disks initiates a search to identify the latest version of the list of quorum disks, that node will be able to discover the latest version of the list.

Figure 1A:
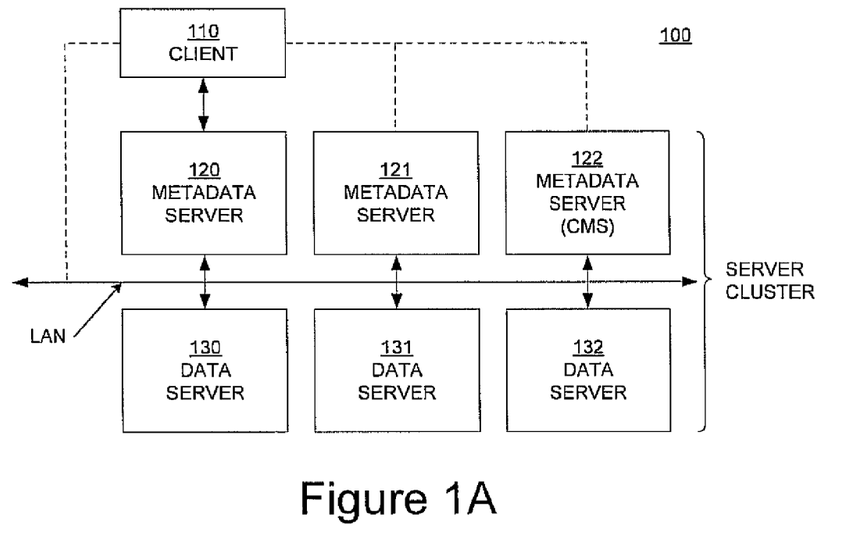
FIGS. 1A, 1B, and 1C are block diagrams depicting examples of network elements upon which embodiments of the present disclosure may be practiced.

FIG. 1A is a block diagram depicting a network 100 upon which embodiments of the present disclosure may be implemented. The network 100 may be referred to as a cluster file system, network file system, or storage area network (SAN). Although the discussion below uses data servers and metadata servers as examples, embodiments according to the present disclosure are not so limited. For example, embodiments according to the invention can be implemented on "traditional" servers using direct attached storage or SAN storage.

In the example of FIG. 1A, the network 100 includes metadata servers 120, 121, and 122 and data servers 130, 131, and 132. The elements in the network 100 may be referred to as nodes or server nodes. Collectively, the nodes may be referred to as a server cluster. The data servers 130-132 may be referred to as object storage devices (OSDs). The data servers 130-132 may be implemented as SCSI (Small Computer System Interface) logical units, known as LUNs; in other words, a node may be a LUN.

Figure 1B:
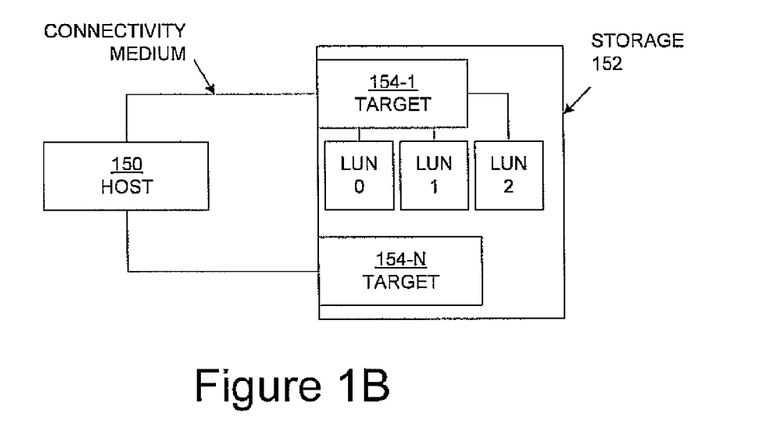

FIG. 1B is a block diagram depicting a host device 150 (e.g., a client or another server) that communicates with storage 152 via some type of connectivity medium, such as, but not limited to, Fibre Channel, SCSI, Ethernet, Integrated Drive Electronics (IDE), and an IP-based network. Storage 152 may include one or more physical elements (e.g., one or more data servers). In a SCSI implementation, for example, storage 152 includes a number N of addressable units, shown as targets 154-1 and 154-N. Associated with each target is a number of LUNs, shown as LUNs 0, 1, and 2 (there may be more than three LUNs per target). A LUN may correspond to a single physical disk—that is, there may be a one-to-one mapping of LUNs to physical disks. A LUN may also be defined as a virtual disk—a virtual disk may span one or more physical disks. Any of the LUNs 0, 1, and 2 in storage 152 can be utilized as a quorum disk according to embodiments of the present disclosure (recall, however, that quorum disks are, in general, selected from different failure domains).

Figure 1C:
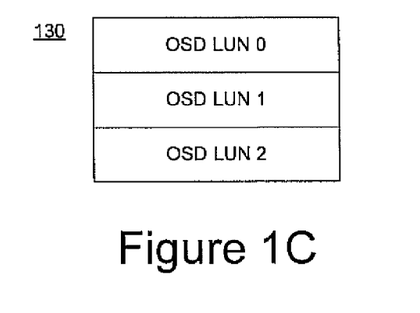

FIG. 1C is a block diagram depicting a data server 130. In the example of FIG. 1C, each LUN 0, 1, and 2 corresponds to an OSD on the data server 130—each LUN is an OSD device (there may be more than three OSDs per data server). Any of the OSD LUNs can be utilized as a quorum disk according to embodiments of the present disclosure (recall, however, that quorum disks are, in general, selected from different failure domains).

With reference again to FIG. 1A, data requested by the client 110 may span multiple objects and may be distributed across the data servers 130-132. The data may also be stored redundantly across multiple objects on different data servers.

The metadata servers 120-122 and the data servers 130-132 can communicate with each other via a local area network (LAN) of some type, such as Ethernet or Infiniband. There may be any number of metadata servers and any number of data servers in the network 100. In the example of FIG. 1A, the client 110 accesses data stored in the data servers 130-132 via one of the metadata servers (e.g., the metadata server 120). Information about the data (metadata) can be stored on the metadata servers 120-122.

In general, the metadata servers 120-122 and the data servers 130-132 present a full file system abstraction to the client 110; in other words, the architecture of the network 100 is, in general, transparent to the client 110. In some embodiments, the client may also access data on data servers 130-132 directly.

In one embodiment, one of the metadata servers 120-122 (e.g., the metadata server 122) serves as a central management server (CMS). The role of the central management server can be passed from the metadata server (MDS) 122 to another server node if, for example, the metadata server 122 should become inoperative or be removed from service. Standard, known mechanisms may be used to select an MDS to host CMS from amongst the multiple MDSs, even in split-brain situations. The central management server may also monitor the activity and health of the nodes in the network 100, and can perform functions related to selecting, initializing, and managing quorum disks for the network 100. Alternatively, each node can monitor the activity and health of other nodes and can notify the central management server if it identifies anything out of the ordinary.

One function of the central management server is to maintain a cluster membership object, which lists the nodes in the server cluster, and an activity count for the nodes. The cluster membership object and activity count can be used as follows.

Consider a scenario in which a first node (node 1) joins the network and indicates that it is going to join a server cluster that includes two other nodes (nodes 2 and 3). If the cluster membership object defines the server cluster as including nodes 2 and 3, then node 1 is permitted to join the server cluster; if the cluster membership object defines the cluster as not including nodes 2 and 3, then node 1 is prevented from joining those nodes to prevent an isolated cluster from being formed.

However, there can be circumstances in which the cluster membership object is out-of-date. To guard against that, the activity count is used to determine whether nodes included in the cluster membership object are active. If a node is active and operative, then its activity count will change (e.g., increase) over time. Thus, if a node appears in the cluster membership object but its activity count is not changing, then the cluster membership object is not up-to-date, in which case a process for identifying the nodes that are in the server cluster can be performed (such a process is known but is outside the scope of the present disclosure).

Figure 2:
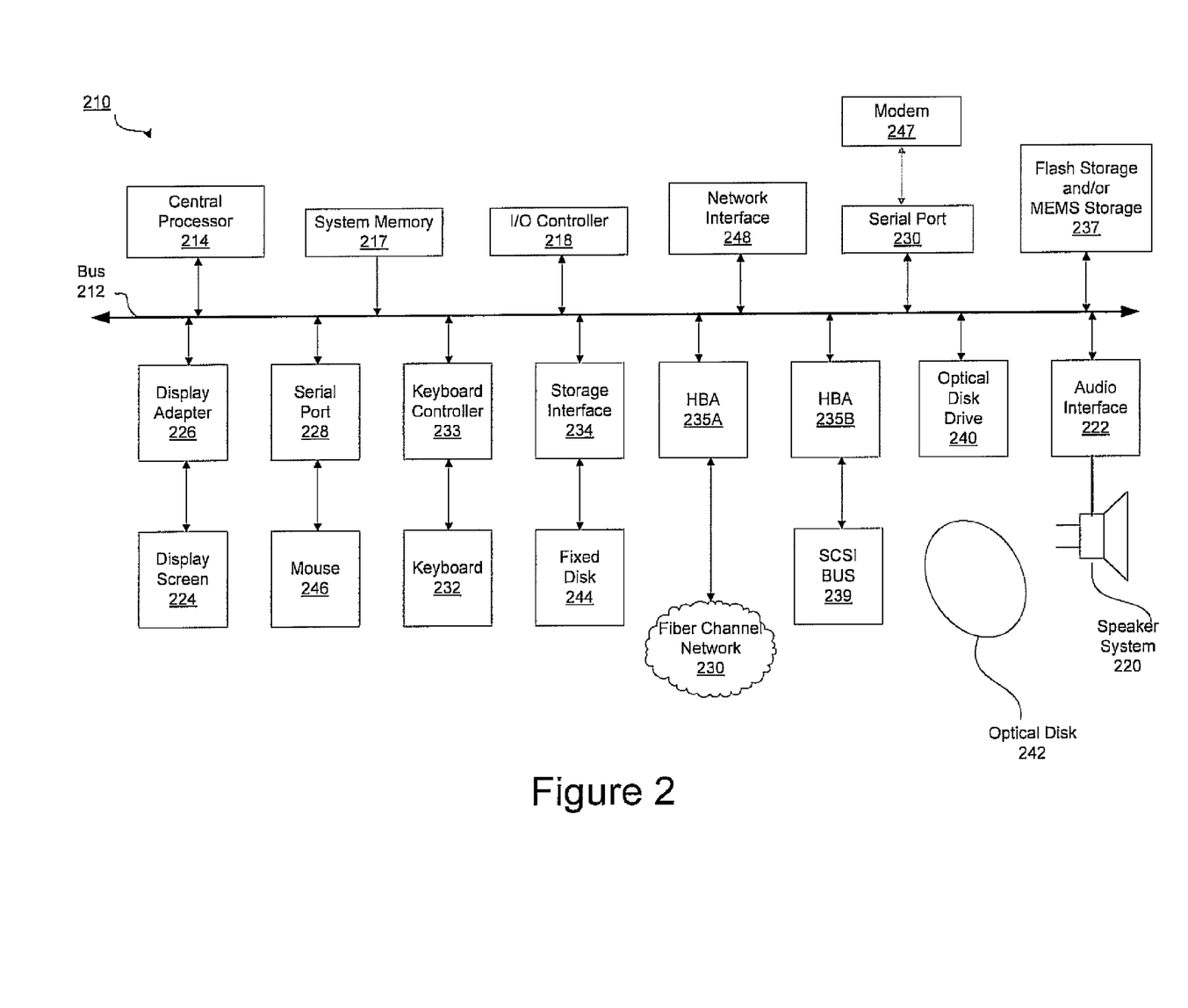
FIG. 2 is a block diagram of a computer system upon which embodiments of the present disclosure may be practiced.

With reference next to FIG. 2, a block diagram of a computer system 210 suitable for implementing the present disclosure is depicted. In the discussion to follow, various and numerous components and elements are described. Various combinations and subsets of those components can be used to implement the devices mentioned in conjunction with FIG. 1A. For example, the client 110 may each be a full-function computer system that employs many if not all of the features of the computer system 210. However, the server nodes 120-122 and 130-132 may utilize only the subset of those features needed to support the functionality provided by those devices. For example, the server nodes may not need a keyboard or display, and may execute a relatively spartan operating system that supports the functionality of data storage and data access and the management of such functionality.

In the example of FIG. 2, the computer system 210 includes a bus 212 which interconnects major subsystems of the computer system. These subsystems include a central processor 214; a system memory 217; an input/output controller 218; an external audio device, such as a speaker system 220 via an audio output interface 222; an external device, such as a display screen 224 via display adapter 226; serial ports 228 and 230; a keyboard 232 (interfaced with a keyboard controller 233); a storage interface 234; a host bus adapter (HBA) interface card 235A operative to connect with a FCoE network 290; an HBA interface card 235B operative to connect to a SCSI bus 239 (alternatives to SCSI include IDE, and Serial Advanced Technology Attachment (SATA)); and an optical disk drive 240 operative to receive an optical disk 242. Also included are a mouse 246 (or other point-and-click device, coupled to bus 212 via serial port 228) and a network interface 248 (coupled directly to bus 212). The modem 247, network interface 248 or some other method can be used to provide connectivity to the network 100 of FIG. 1A.

The bus 212 of FIG. 2 allows data communication between the central processor 214 and system memory 217, which may include ROM or flash memory and RAM (not shown), as previously noted. The RAM is generally the main memory into which the operating system and application programs are loaded. The ROM or flash memory can contain, among other code, the Basic Input-Output System (BIOS) which controls basic hardware operation such as the interaction with peripheral components.

Applications resident within the computer system 210 are generally stored on and accessed via a computer-readable storage medium, such as a hard disk drive (e.g., the fixed disk 244), an optical drive (e.g., the optical drive 240), Flash Memory unit 237, MEMS storage, or other storage medium. Applications can be in the form of electronic signals modulated in accordance with the application and data communication technology when accessed via network modem 247 or interface 248.

Continuing with reference to FIG. 2, storage interface 234, as with the other storage interfaces of computer system 210, can connect to a standard computer-readable storage medium for storage and/or retrieval of information, such as a fixed disk drive 244. The fixed disk drive 244 may be a part of the computer system 210, or it may be separate and accessed through other interface systems. The modem 247 may provide a direct connection to a remote server via a telephone link or to the Internet via an internet service provider (ISP). The network interface 248 may provide a direct connection to a remote server via a direct network link to the Internet via a POP (point of presence). The network interface 248 may provide such a connection using wireless techniques, including digital cellular telephone connection, Cellular Digital Packet Data (CDPD) connection, digital satellite data connection, or the like.

Many other devices or subsystems (not shown in FIG. 2) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2.

The operation of a computer system such as that shown in FIG. 2 is readily known in the art and is not discussed in detail in this application. Code to implement the present disclosure can be stored in computer-readable storage media such as one or more of the system memory 217, fixed disk 244, optical disk 242, Flash storage, and/or MEMS storage 237. The operating system provided on the computer system 210 may be MS-DOS®, MS-WINDOWS®, OS/2®, UNIX®, Linux®, Berkeley Software Distribution (BSD), or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
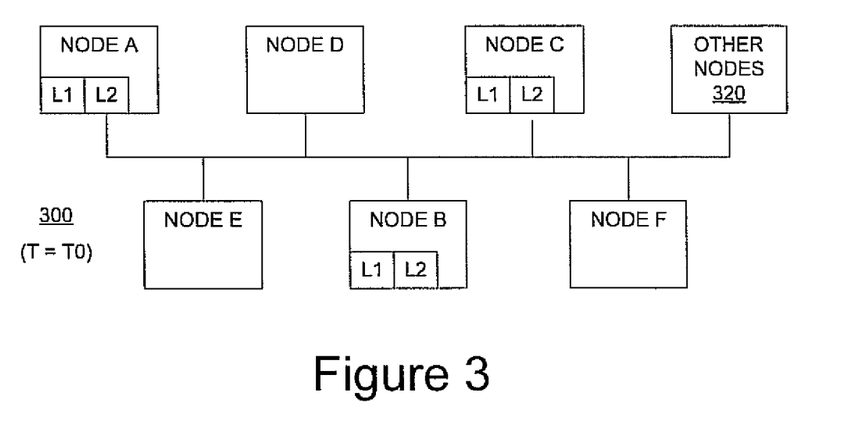
FIG. 3 is a block diagram illustrating nodes in a server cluster according to embodiments of the present disclosure.

FIG. 3 is a block diagram illustrating a number of nodes A, B, C, D, E, and F (e.g., data disks, data servers, LUNs, OSDs, etc.) that are part of a larger server cluster 300 at time T0; that is, nodes A-F do not represent the entire server cluster, but only selected nodes useful for describing the principles of the present disclosure. Other nodes in the server cluster are collectively illustrated as nodes 320, and may include a central management server such as that previously mentioned herein. The server cluster 300 is analogous to (e.g., at least a part of) the network 100 of FIG. 1A.

Time T0 corresponds to the point at which the server cluster 300 is initialized; specifically, with regard to the present disclosure, time T0 corresponds to the point at which quorum disks are selected and initialized. At time T0, the nodes A-F can communicate with each other and with the other nodes 320 in the server cluster 300.

Figure 4A:
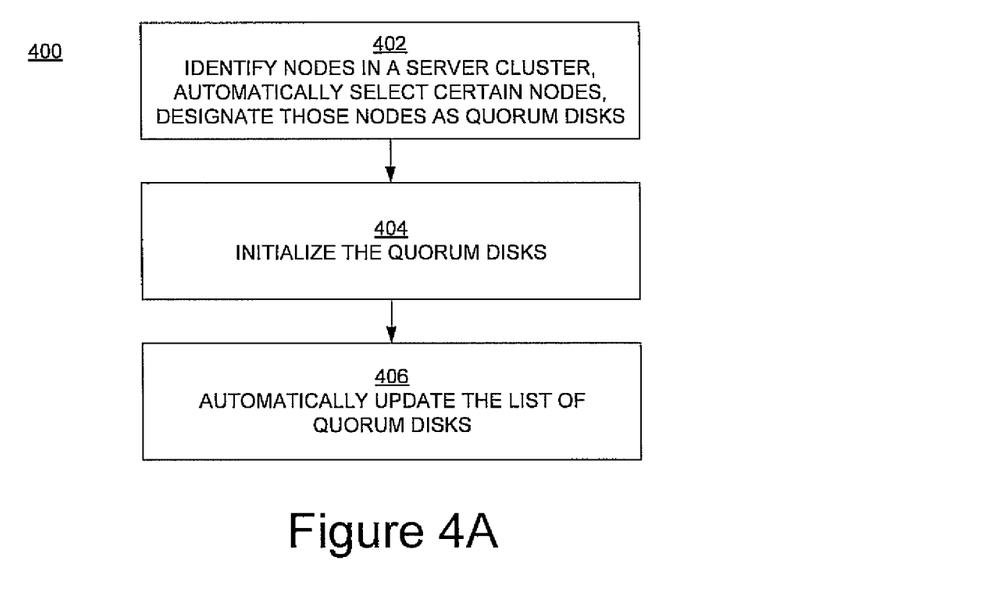
FIGS. 4A, 4B, 4C, and 4D are flowcharts illustrating computer-implemented methods for managing quorum disks according to embodiments of the present disclosure.

FIG. 3 is described further in conjunction with FIG. 4A, which is a flowchart 400 illustrating an embodiment of a computer-implemented method for managing quorum disks. Flowchart 400 can be implemented as computer-executable instructions residing on some form of computer-readable storage medium (e.g., in a memory subsystem or unit of the system 210 of FIG. 2). Not all of the steps included in the flowchart 400 may be performed, and the steps may be performed in a different order than described.

Figure 4B:
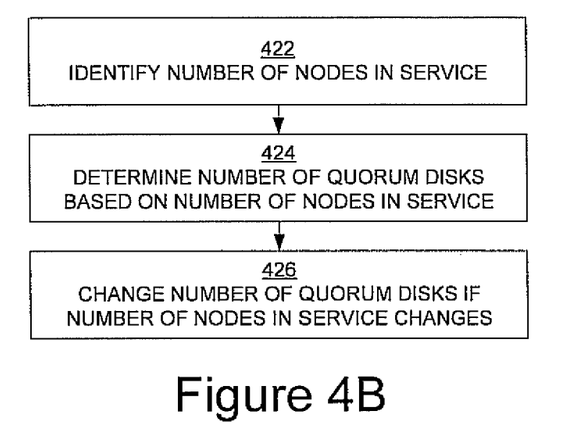

In block 402 of FIG. 4A, at time T0, the nodes that constitute a server cluster are automatically identified (e.g., listed), a subset of those nodes is selected from the list of network nodes, and the nodes in the subset are designated as quorum disks. In one embodiment, the number of quorum disks in the subset is automatically determined as a function of the total number of nodes in the server cluster; as the size of the server cluster changes, the number of quorum disks changes. As discussed above, other factors can influence the number of quorum disks. With reference to FIG. 4B, in block 422, the number of nodes in service is identified; in block 424, the number of quorum disks is determined based on, for example, the number of nodes in service; and in block 426, the number of quorum disks is changed (increased or decreased) if the number of nodes in services changes by a large enough amount—more quorum disks can be added if the number of nodes in service increases, for example. The process just described can be used to implement a change to any of the other factors that influence the number of quorum disks. For instance, if there is a change in the desired redundancy level or the desired availability level, then the process described by FIG. 4B can be used to change the number of quorum disks. In general, instead of a relatively static set of quorum disks, the number of quorum disks is dynamic. In the example of FIG. 3, the subset of quorum disks includes the nodes A, B, and C.

In one embodiment, the quorum disks are chosen from different failure domains previously defined for the server cluster 300. For example, if the nodes are arranged in different racks, each rack may be considered a failure domain, depending on how the racks are configured relative to one another. Alternatively, each node in a rack may be considered a different failure domain. In general, the failure domains are chosen so that the quorum disks are "single failure proof," such that a single failure or event would not be expected to disable more than a few of the quorum disks or prevent access to more than a few of the quorum disks; the manner in which failure domains are defined is known but is beyond the scope of the present disclosure.

Figure 4C:
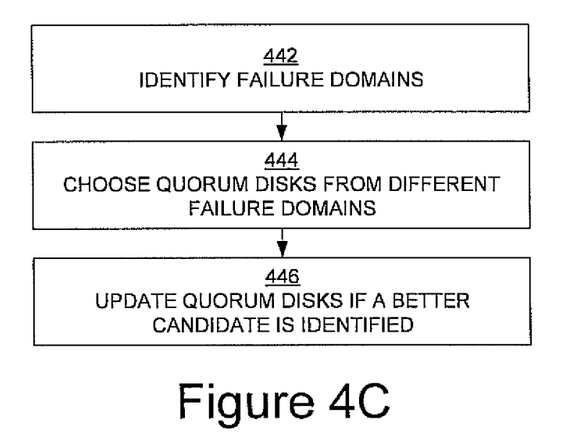
Figure 4D:
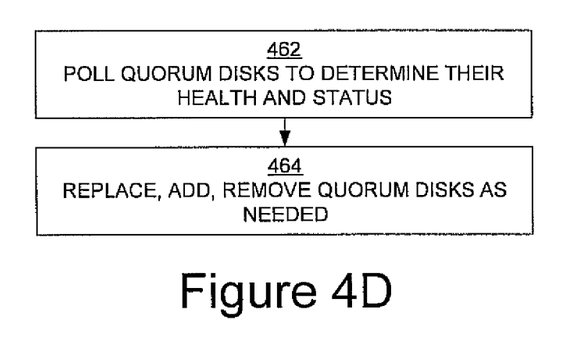

With reference to FIG. 4C, in block 442, failure domains are identified/selected; in block 444, quorum disks are chosen across the failure domains; and in block 446, the quorum disks can be updated (e.g., one disk replaced with another) if a better candidate is identified based on the distribution across failure domains or based on a change in the mapping of the failure domains.

Returning to FIG. 4A, in block 404, during cluster initialization, each quorum disk A, B, and C can be initialized with information such as a list L1 of nodes in the server cluster. In the example of FIG. 3, the list L1 would include the node identifiers (IDs) for nodes A-F as well as the node IDs for other nodes (not shown) in the server cluster 300. The initialization information can also include an activity counter (not shown), which can be used to detect non-active nodes and pre-existing split brain scenarios. The initialization information can also include a list L2 of the node IDs for the nodes currently designated as quorum disks. In the example of FIG. 3, the list L2 includes nodes A, B, and C.

In one embodiment, version information is also associated with each copy of the list L2. The version information may include a version number and/or a time stamp.

Figure 5:
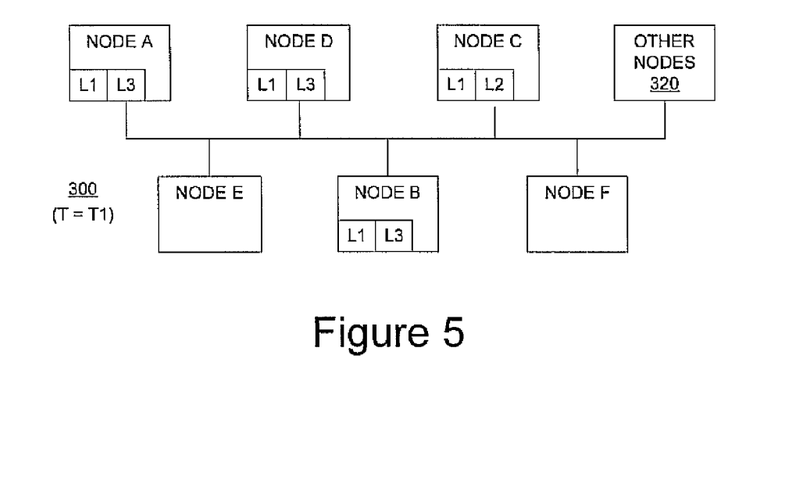
FIG. 5 is a block diagram illustrating nodes in a server cluster according to embodiments of the present disclosure.

In block 406 of FIG. 4A, with reference also to FIG. 5, at some time T1 after time T0, a change is made to the subset of nodes designated as quorum disks. The change may be made for any number of reasons. For example, one of the designated nodes may become unavailable (e.g., inoperative) for some reason—it may be malfunctioning, it may be intentionally removed from service for maintenance, or it may be intentionally removed from service because the server cluster is over-provisioned. With reference to FIG. 4C, the quorum disks can be polled (e.g., by the central management server or, in some embodiments, by any of the data servers or clients) to determine if they are healthy (e.g., operative) and to determine their status (e.g., still online). Also, as mentioned above, a change to the designated quorum disks may be made because a better candidate is identified; for example, a node that provides better balance across failure domains may be inserted into the list of quorum disks in place of another node on the list. In block 464, one or more quorum disks can be replaced, added, or removed. A decision on whether to add/remove or replace, and a decision with regard to which quorum disk to add or remove, can be made based on the factors described above (e.g., based on the number of nodes in service, the distribution across failure domains, etc.) or based on other factors. Instead of a relatively static list of quorum disks, the list of quorum disks is dynamic.

In the example of FIG. 5, node C is replaced with node D as a quorum disk. The new list L3, which includes nodes A, B, and D, is stored on nodes A, B, and D. In the example of FIG. 5, the update is considered successful because at least a simple majority of the quorum disks on list L2 are updated with the change and receive the new list L3. If at least a simple majority of quorum disks on the older version of the list (list L2) is not updated, then the process may be repeated with a different list of quorum disks until the update is successful on a simple majority of the quorum disks on the list L2.

If replacement of multiple quorum disks from the list L2 is needed, then each node can be replaced one by one. Alternatively, they can be updated at the same time if the update succeeds on a majority of the current list of quorum disks and a majority of the new quorum disks.

It is not necessary to remove one node from the list of quorum of disks in order to include a new node in the list. A node may be added to the list of quorum disks without removing another node from the list, or a node may be removed from the list without being replaced. As mentioned above, the number of quorum disks can be a function of the total number of nodes in the server cluster or other factors; for example, as the size of the server cluster increases or decreases in number, the number of quorum disks can increase or decrease correspondingly.

Figure 6:
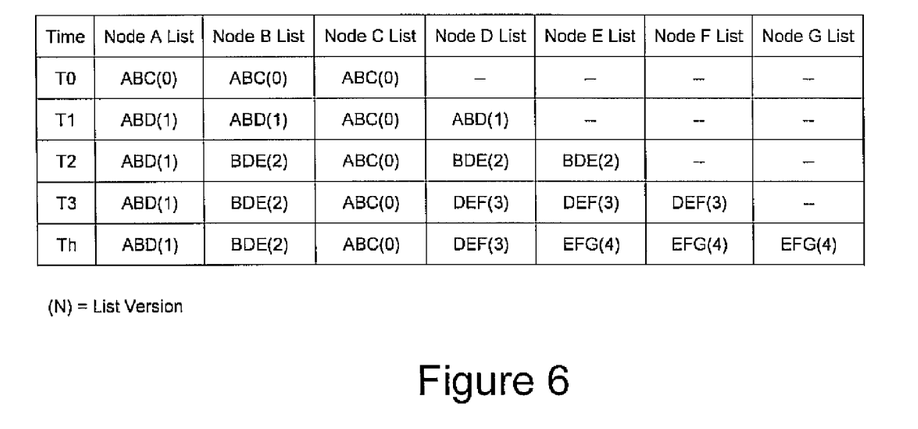
FIG. 6 is a table illustrating an example of a computer-implemented method for locating a latest version of a list of quorum disks according to embodiments of the present disclosure.

The discussion above is illustrated by way of the examples of FIG. 6. For simplicity of discussion, the examples are discussed using three quorum disks; however, the present disclosure is not so limited. Also, although events are depicted and described as occurring in a certain order, embodiments according to the present disclosure are not so limited. The events and the sequences of events described in conjunction with FIG. 6 are selected to illustrate the principles of the present disclosure by way of example; the examples can be readily extended to other (similar) events and event sequences.

At time T0, as presented above, the list of quorum disks includes nodes A, B, and C. A list of quorum disks is stored on each of the nodes A, B, and C. A first version number (version 0) is associated with each copy of the list of quorum disks (the version number for the file is the number in parentheses in FIG. 6; a time stamp may be used instead of, or in addition to, the version number). The list of quorum disks is also communicated to other nodes 320 in the server cluster 300 (FIG. 3) in a best effort manner.

At time T1, as presented above, version 0 of the list of quorum disks is updated to include node D in place of node C. In the example of FIG. 6, version 0 of the list remains stored on node C, although this may not always be the case. Version 1 of the list, which includes nodes A, B, and D, is stored on each of the nodes on the list. Version 1 of the list is also communicated to each of the other nodes 320 in the server cluster 300 (FIG. 3) in a best effort manner.

At time T2, version 1 of the list of quorum disks is updated to include node E in place of node A. In the example of FIG. 6, version 1 of the list remains stored on node A, although this may not always be the case. Version 2 of the list, which includes nodes B, D, and E, is stored on each of the nodes on the list. Version 2 of the list is also communicated to each of the other nodes 320 in the server cluster 300 (FIG. 3) in a best effort manner.

At time T3, version 2 of the list of quorum disks is updated to include node F in place of node B. In the example of FIG. 6, version 2 of the list remains stored on node B, although this may not always be the case. Version 3 of the list, which includes nodes D, E, and F, is stored on each of the nodes on the list. Version 3 of the list is also communicated to each of the other nodes 320 in the server cluster 300 (FIG. 3) in a best effort manner.

Figure 7:
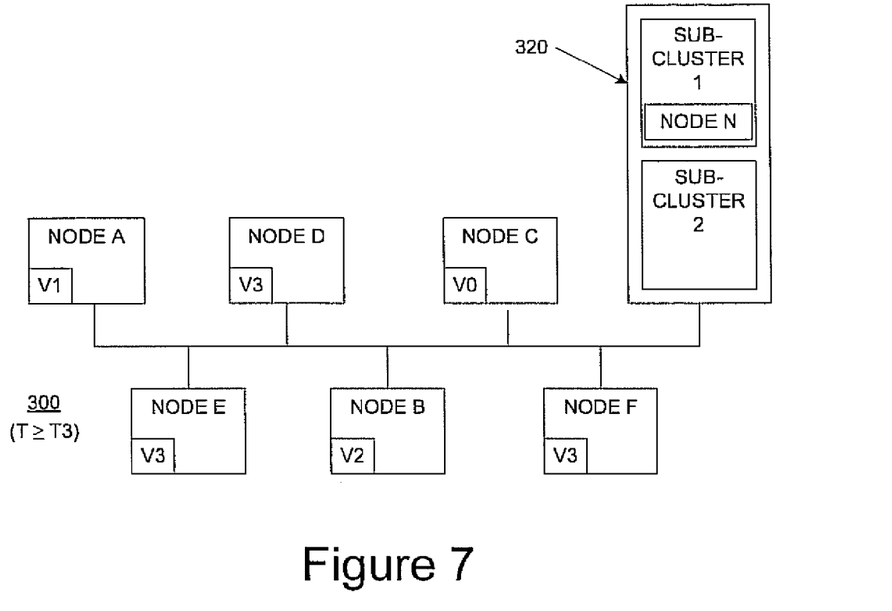
FIG. 7 is a block diagram illustrating nodes in a server cluster according to embodiments of the present disclosure.

At any time T0 through T3 or thereafter, a split-brain event may occur, causing the server cluster 300 to be partitioned into sub-clusters. To best illustrate the principles of the present disclosure, a situation in which the split-brain scenario occurs at or after time T3 is chosen. As a result of the split-brain event, the other nodes 320 are partitioned into sub-clusters 1 and 2 (actually, there may be more than two sub-clusters), as shown in FIG. 7. The nodes A-F may also be partitioned into sub-clusters.

As noted above, an effort is made to communicate the list of quorum disks to each of the others nodes 320 in the server cluster 300. If a node N is able to receive the most recent version, then that node can contact (or attempt to contact) the quorum disks. Other nodes with the most recent version of the list will act in a similar manner. Accordingly, the various sub-clusters 1 and 2 can coordinate with each other through the quorum disks and reach an agreement as to which sub-cluster is to survive and which sub-clusters are to be shut down. The manner in which the sub-clusters reach an agreement is known but is outside the scope of this disclosure.

However, if any node N is not able to receive the most recent version of the list of quorum disks, that node can initiate a search and discover the most recent list in the manner about to be described. In general, when a node is added to the server cluster 300, that node will be initialized with the version of the list of quorum disks that exists at that time. That node may or may not receive later versions of the list of quorum disks. In the example of FIG. 6, the worst-case scenario corresponds to a situation in which a node N receives version 0 of the list but does not receive any subsequent versions.

To locate the most recent version of the list of quorum disks starting from version 0, for example, node N would undertake the following actions. (Note that a search may not or need not start from version 0. The search will start from latest version known to node N.) First, node N would attempt to access all of the quorum disks identified in version 0 of the list. That is, node N would attempt to access quorum disks A, B, and C. To assure success, node N would access at least a quorum (a simple majority) of the quorum disks included in version 0 of the list. That is, to be successful, node N can access quorum disks A and B, quorum disks B and C, quorum disks A and C, or quorum disks A, B, and C.

If a simple majority of quorum disks on the version of the latest list found by node N cannot be accessed, then node N may stop the search process and then begin it later.

The purpose in having node N access the quorum disks on the version of the list (version 0) known to node N is to have node N learn whether any of the nodes on that list has a later version of the list. Accordingly, node N determines that a later version (version 2) of the list is held by node B. Next, node N repeats the process described above—that is, node N would attempt to access all of the quorum disks identified in version 2 of the list, which includes quorum disks B, D, and E. To be successful, node N would access at least a quorum (a simple majority) of the quorum disks included in version 2 of the list. That is, to be successful, node N will access quorum disks D and E, having already accessed quorum disk B.

Again, node N's purpose in accessing the quorum disks on its current version of the list (version 2) is to learn whether any of the nodes on that list has a later version of the list. Accordingly, from either node D or E, node N determines that a later version (version 3) exists.

At this point, since a simple majority of the quorum disks have a list with version number 3, node N can conclude that version 3 is the most recent version of the list. Node N is able to make this conclusion because it has accessed at least a simple majority (nodes D and E) of the nodes on version 3 of the list. Recall that, in order to successfully update the list of quorum disks and create a new version of the list, at least a simple majority of the quorum disks on the older version of the list needs to be updated with the newer version of the list. Hence, considering the example of FIG. 6, node N does not need to access node F to determine if node F has a later version of the list—if there was a version 4 of the list, that version would appear at least on either node D or node E as well. This point is illustrated by considering a hypothetical update at time Th, in which a node G replaces node D. For version 4 to be successfully created, then a simple majority of the nodes D, E, and F would need to be updated. Thus, either nodes D and E, or E and F, or D and F, at least, would be updated with version 4 of the list—as can be seen, at least node D or node F receives version 4.

Thus, using the process just described, node N is able to discover the latest version of the list of quorum disks. Having identified the latest list of quorum disks, node N can then access the quorum disks as part of the process of responding to the split-brain event.

As shown by the examples just discussed, the use of a version number for the list of quorum disks facilitates the search for the latest version of the list, but a version number for the list of quorum disks is not required to discover the latest version of the list. Absent a version number for the list of quorum disks, node N can access different combinations (different quorums, e.g., different simple majorities) of nodes on each list accessed by node N until it reaches a point in the search process at which further searches do not uncover a different version of the list of quorum disks. For instance, in the example of FIG. 6, node N may begin its search with a list of quorum disks that includes nodes A, B, and C, as described above. To be successful, node N will access at least nodes A and B, nodes B and C, or nodes A and C. Without a version number for the quorum disk lists found on the servers A, B, and C, node N can explore respective simple majorities of nodes identified on those lists. Thus, in the second phase of the search, node N will explore combinations of nodes selected from the list on node A (which includes nodes B and D) and node B (which includes nodes B, D, and E), where each combination of nodes includes at least a simple majority of the nodes from the respective lists (in this example, the lists on node C can be removed from further consideration because it is the same as the list on node A). In the third phase of the search, node N will explore combinations of nodes selected from the lists on nodes B, D and E. In the fourth phase of the search, node N will explore combinations of nodes selected from the lists on nodes D, E, and F. The process repeats until the search fails to turn up a version of the list that is different from the lists already discovered. As can be seen, the search conducted by node N without the use of version numbers for the list of quorum disks will reach the same conclusion as the search conducted by node with the use of version numbers. However, the search conducted using version numbers for the lists of quorum disks can, in general, be accomplished more efficiently.

The latest version of the list of quorum disks returned by the process just described is timing-dependent. For example, a client that starts the process at time T2 and completes the process before time T3 will conclude (correctly) that the latest version of the server list includes servers B, D, and E. Thus, this process does not eliminate the need for coordination between active nodes.

Figure 8:
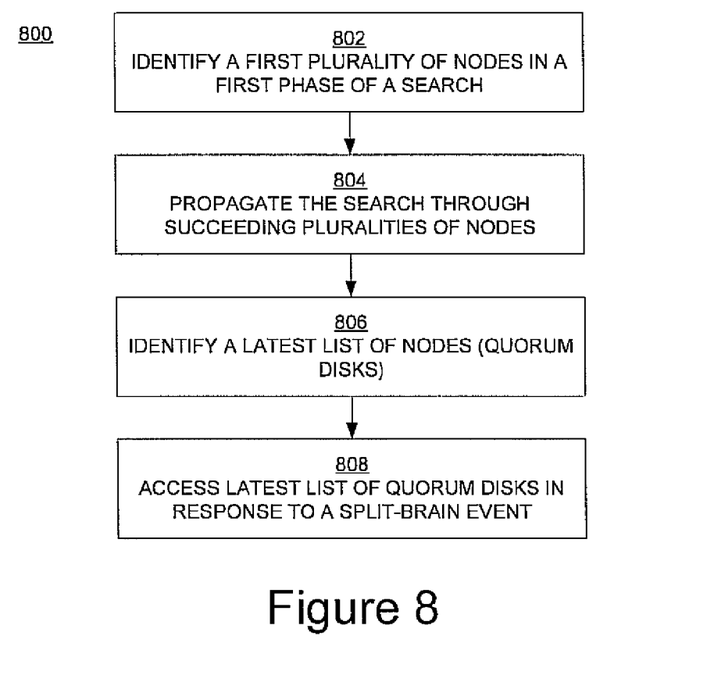
FIG. 8 is a flowchart illustrating a computer-implemented method for locating a latest version of a list of quorum disks according to embodiments of the present disclosure.
Figure 9:
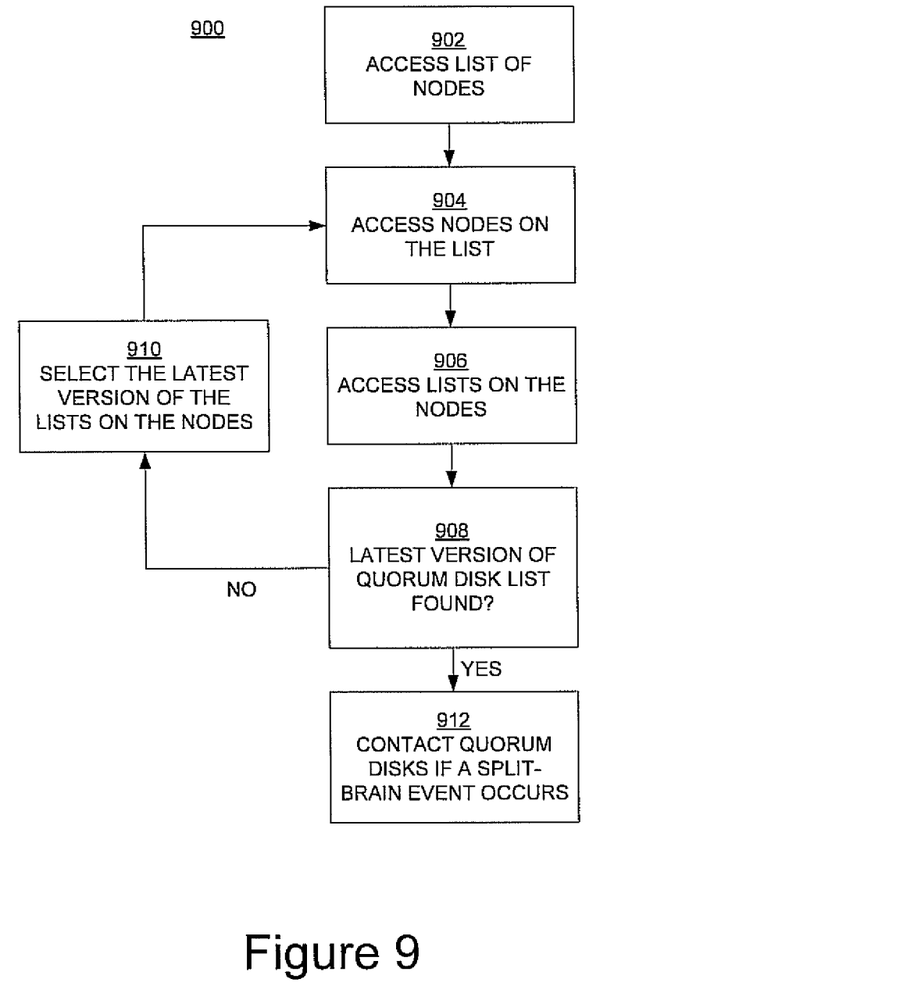
FIG. 9 is a flowchart illustrating a computer-implemented method for locating a latest version of a list of quorum disks according to embodiments of the present disclosure.

FIGS. 8 and 9 are flowcharts 800 and 900, respectively, illustrating embodiments of computer-implemented methods for responding to a split-brain event. Flowcharts 800 and 900 can be implemented as computer-executable instructions residing on some form of computer-readable storage medium (e.g., in a memory subsystem or unit of the system 210 of FIG. 2). Not all of the steps included in the flowcharts 800 and 900 may be performed, and the steps may be performed in a different order than described. The flowcharts 800 and 900 are more readily understood when viewed in light of the example of FIG. 6.

With reference first to FIG. 8, in block 802, a first plurality of nodes in a server cluster is identified during a first phase of a search for a list of nodes designated as quorum disks. In block 804, the search is propagated through succeeding pluralities of nodes, where each succeeding plurality of nodes is selected based upon lists of nodes stored on a node or nodes identified in a preceding phase of the search.

In block 806, the latest list of nodes designated as quorum disks is identified, where the latest list is selected from lists of nodes identified during the search. In block 808, the nodes on the list can be accessed in response to a split-brain event that partitions the server cluster into different sub-clusters.

More specifically, with reference to FIG. 9, in block 902, a node (e.g., node N referred to previously herein) accesses a list of nodes (a list of quorum disks). The list accessed by the node N is the latest version of the list that the node is aware of, which may not be the latest version of the list. In block 904, node N accesses the nodes on the list. In one embodiment, the node accesses a simple majority of the nodes on the list.

In block 906, node N accesses another list on each of the nodes contacted in block 904. In block 908, in one embodiment, if the version number for each list on each of the contacted nodes, or for each list on at least a simple majority of the contacted nodes, is the same as (not greater than) the version number for the list known to node N at that point in the search process, then the most recent version of the list of nodes (quorum disks) has been found and the flowchart 900 proceeds to block 912. Otherwise, the flowchart proceeds to block 910.

In block 910, one of the later versions of the lists (specifically, the latest version of those lists) identified in blocks 906 and 908 is selected. The flowchart 900 then returns to block 904.

In block 912, the latest version of the list of quorum disks has been found by node N, and node N can contact the nodes (quorum disks) on that list in response to a split-brain event.

In summary, embodiments of the present disclosure uses network nodes (e.g., data servers, LUNs, object storage devices, data disks, etc.) as quorum disks. In other words, nodes that are part of a server cluster and that function as object storage devices also take on the functionality of quorum disks. Thus, additional, special or dedicated hardware and configurations are not required for quorum disks, reducing costs. Administrative overhead is also reduced, further reducing costs. For example, the health of the quorum disks is monitored as part of the routine process for monitoring the health of the network nodes used for data storage. In addition, the number of quorum disks may be commensurate with (e.g., proportional to) the number of nodes in the server cluster, and can be scaled dynamically as nodes are added to or removed from the cluster, or to change the redundancy level or availability level. Furthermore, quorum disks are chosen across failure domains to reduce or prevent the possibility that many or all of the quorum disks will be inaccessible or fail at the same time. Reliability and resilience are improved not only because the quorum disks are routinely monitored as mentioned above, but also because of the dynamic nature in which quorum disks are added and removed—failed quorum disks are readily identified and replaced.

Although the present disclosure does not rely on dedicated quorum disks, it can be implemented in combination with dedicated quorum disks.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions for causing a computer system to perform a method comprising:

identifying a first number of nodes that constitute a server cluster; designating a subset comprising not more than a second number of said nodes as quorum disks for said server cluster, said second number less than said first number, wherein said quorum disks are accessed in response to a split-brain event that partitions said server cluster into different sub-clusters of nodes;

storing, on each of said quorum disks, a first list identifying said nodes that constitute said server cluster;

storing a second list identifying said subset of nodes designated as quorum disks on at least a simple majority of nodes on said second list; and replacing said second list with a third and more recent list of quorum disks only if said third list is updated on at least a simple majority of quorum disks on said second list.

2. The non-transitory computer-readable storage medium of claim 1 wherein said identifying further comprises choosing quorum disks from different failure domains that are defined for said server cluster.

3. The non-transitory computer-readable storage medium of claim 1 wherein said method further comprises:
   determining that a node on said second list is unavailable; and
   updating said second list to include another node in said server cluster in place of said node that is unavailable.

4. The non-transitory computer-readable storage medium of claim 1 wherein said method further comprises automatically changing the number of quorum disks in response to a change in the number of nodes in said server cluster.

5. The non-transitory computer-readable storage medium of claim 1 wherein said method further comprises
   monitoring activity of said nodes in said server cluster to identify candidates for quorum disks;
   monitoring activity of said quorum disks on said second list;
   automatically identifying a quorum disk on said second list that is unavailable; and
   automatically replacing the unavailable quorum disk with a node selected from said candidates.

6. The non-transitory computer-readable storage medium of claim 1 wherein said storing further comprises associating version information with said second list.

7. The non-transitory computer-readable storage medium of claim 1 wherein said method further comprises storing on each of said quorum disks information comprising an activity count associated with said nodes in said server cluster.

8. A computer-implemented method comprising:
   accessing a server cluster comprising a first number of nodes;
   identifying a first subset of said nodes during a first phase of a search, said search to identify nodes designated as quorum disks for said server cluster;
   storing, on each of said quorum disks, a first list identifying said nodes that constitute said server cluster;
   after said first phase, propagating said search through succeeding subsets of said nodes, wherein each succeeding subset of said nodes is selected based upon lists of nodes stored on nodes identified in a preceding phase of said search;
   identifying a latest list of said nodes, wherein said latest list is selected from lists of nodes identified during said search and comprises a second subset comprising not more than a second number of said nodes in said server cluster, said second number less than said first number, wherein said second subset of nodes comprises said quorum disks; and
   storing said latest list identifying said second subset of nodes designated as quorum disks on at least a simple majority of nodes on said latest list, wherein further nodes in said latest list are accessed in response to a split-brain event that partitions said server cluster into different sub-clusters of nodes.

9. The computer-implemented method of claim 8 further comprising replacing a second list of quorum disks with a third and more recent list of quorum disks only if said third list is updated on at least a simple majority of quorum disks on said second list.

10. The computer-implemented method of claim 8 further comprising choosing quorum disks from different failure domains defined for said server cluster.

11. The computer-implemented method of claim 8 further comprising:
    monitoring activity of said nodes in said server cluster to identify candidates for quorum disks;
    monitoring activity of said nodes designated as said quorum disks;
    automatically determining that a node designated as a quorum disk is unavailable; and
    automatically designating another node selected from said candidates as a quorum disk in place of said node that is unavailable.

12. The computer-implemented method of claim 8 further comprising selecting a number of said nodes in said server cluster as quorum disks based on a factor selected from the group of: the number of said nodes in said server cluster; a desired availability level; a desired redundancy level.

13. The computer-implemented method of claim 8 further comprising associating version information with each of said lists including said latest list.

14. A data server in a server cluster, said data server comprising:
    a processor; and
    memory coupled to said processor and having stored therein instructions that, if executed by said data server, cause said data server to execute a method comprising:
       selecting a subset of a first number of data servers that are members of said server cluster and designating data servers in said subset as quorum disks for said server cluster, wherein said subset includes said data server and comprises not more than a second number of said data servers in said server cluster, said second number less than said first number;
       storing, on each of said data servers designated as quorum disks, a first list identifying said data servers that constitute said server cluster;
       storing a second list identifying said subset of data servers designated as quorum disks on at least a simple majority of data servers on said second list; and
       replacing said second list with a third and more recent list of quorum disks only if said second list is received by at least a simple majority of quorum disks on said second list, wherein said data server is accessed in response to a split-brain event that partitions said server cluster into different sub-clusters of data servers.

15. The data server of claim 14 wherein said quorum disks are chosen from different failure domains that are defined for said server cluster.

16. The data server of claim 14 wherein said method further comprises updating said second list to include another data server in said server cluster in place of a data server on said second list that is unavailable.

17. The data server of claim 14 wherein a number of said data servers designated as said quorum disks is a function of a factor selected from the group consisting of: the number of said data servers in said server cluster; a desired redundancy level; a desired availability level.

18. The data server of claim 14 wherein said data servers in said server cluster are monitored to identify active data servers that are candidates for said quorum disks, wherein said quorum disks on said second list are also monitored to identify a quorum disk on said second list that is unavailable, wherein further an unavailable quorum disk on said second list is automatically replaced with a data server selected from said candidates to generate said third list.

19. The data server of claim 14 wherein first version information is associated with said second list and second version information is associated with said third list.

* * * * *